Jan. 31, 1956

C. F. WHITE 2,732,792

COMPRESSES

Filed Aug. 19, 1952

CECIL F. WHITE
INVENTOR

HUEBNER, BEEHLER,
WORREL & HERZIG
ATTORNEYS

BY

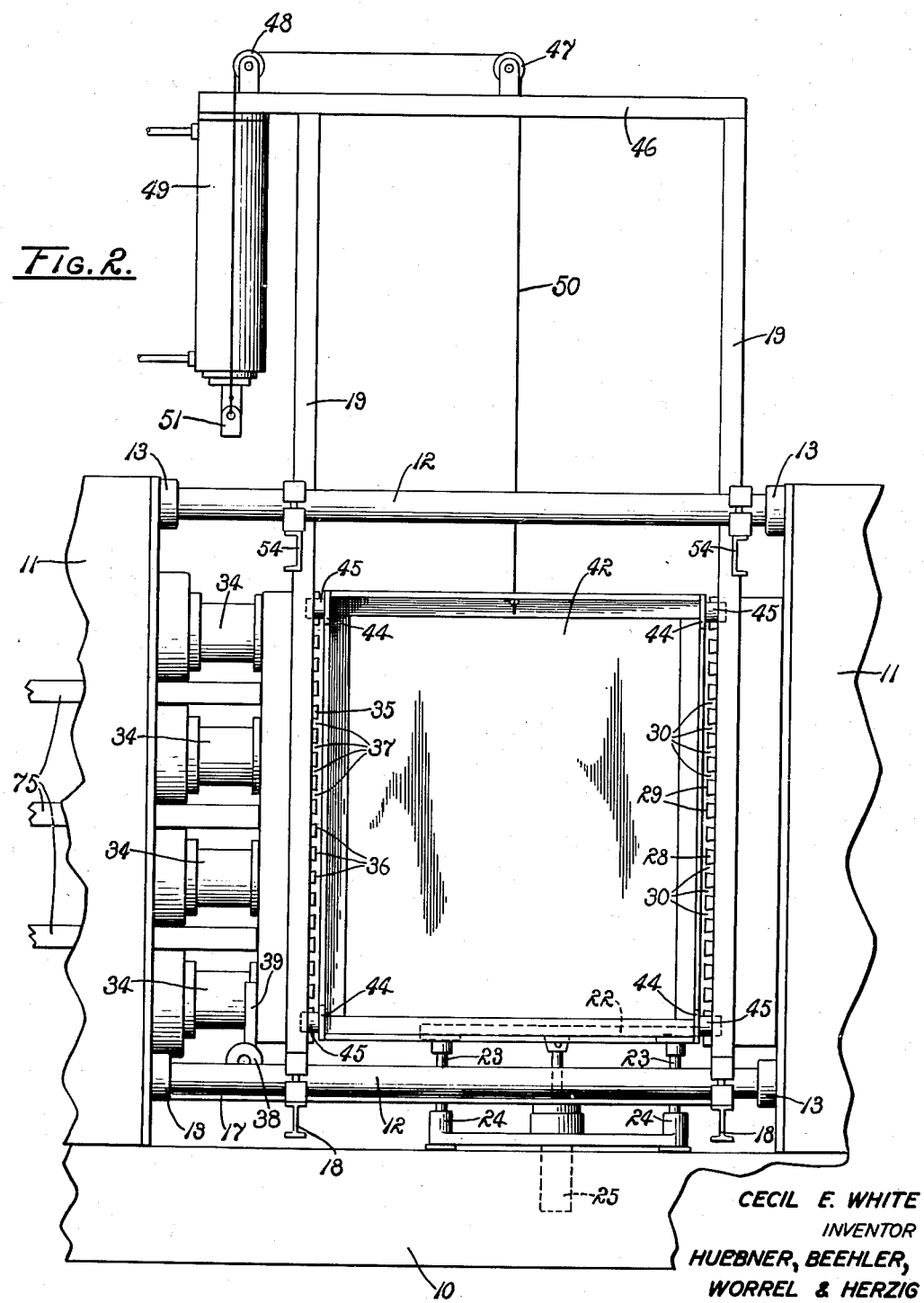

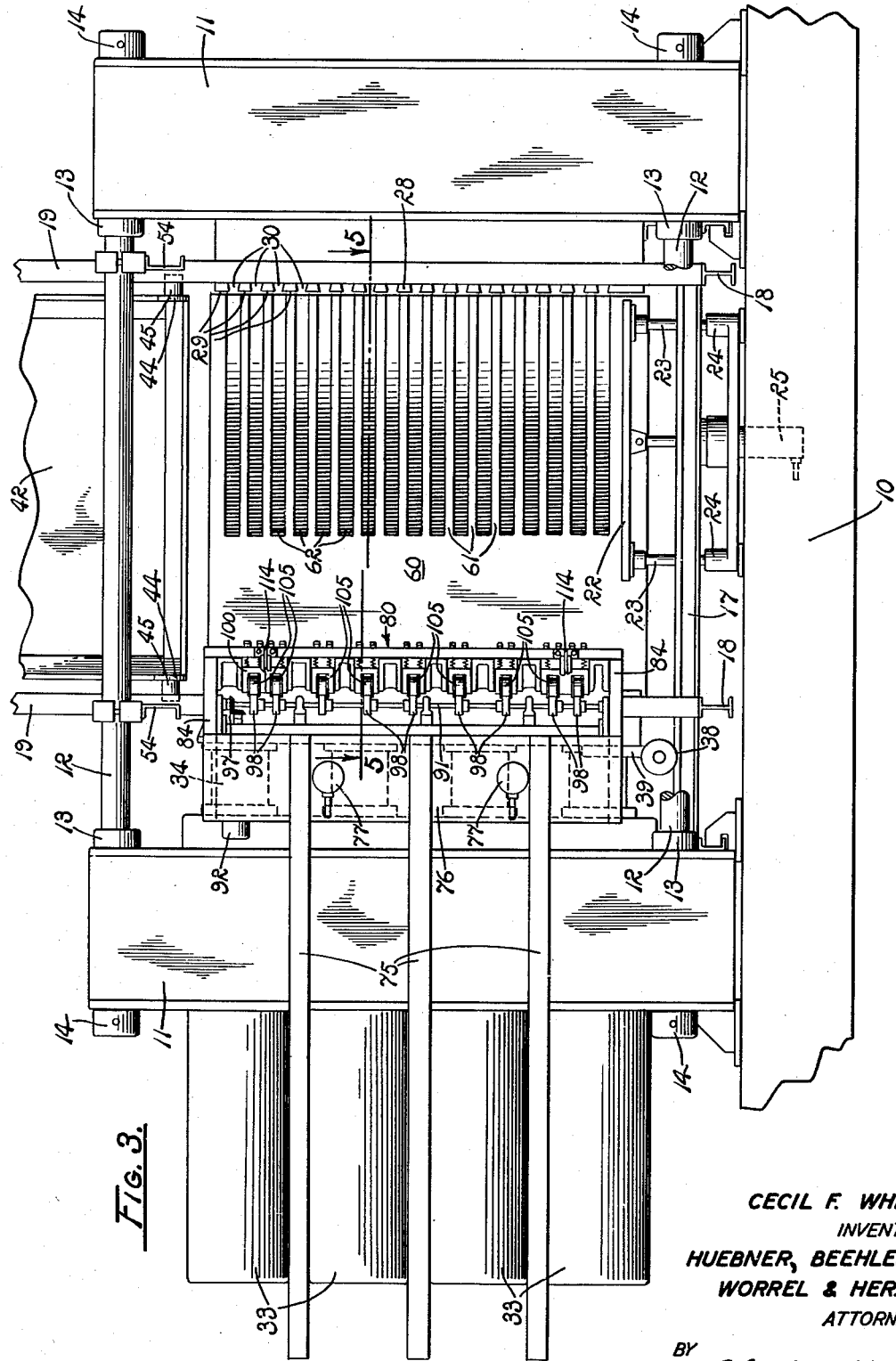

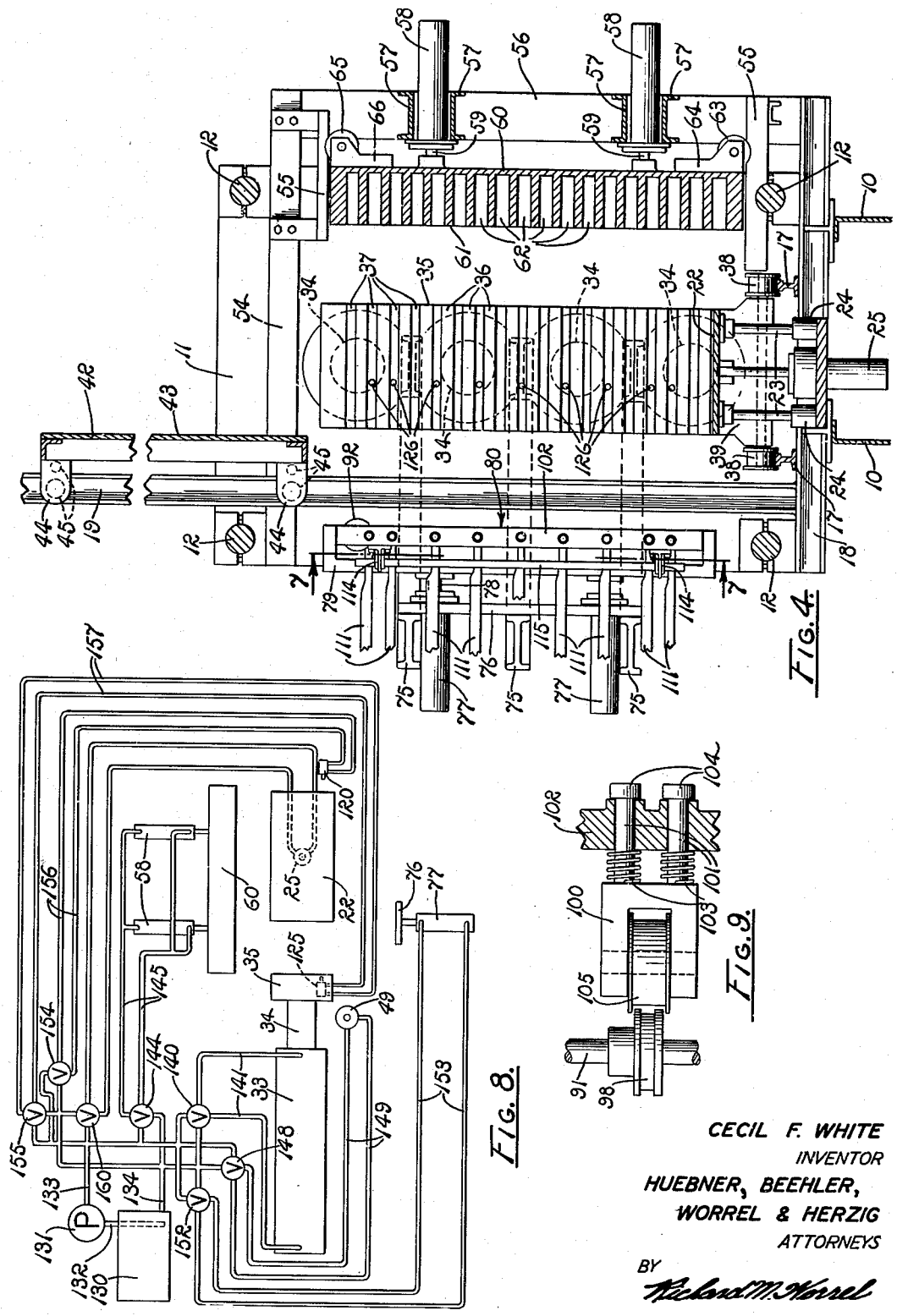

Jan. 31, 1956 C. F. WHITE 2,732,792
COMPRESSES
Filed Aug. 19, 1952 5 Sheets-Sheet 5
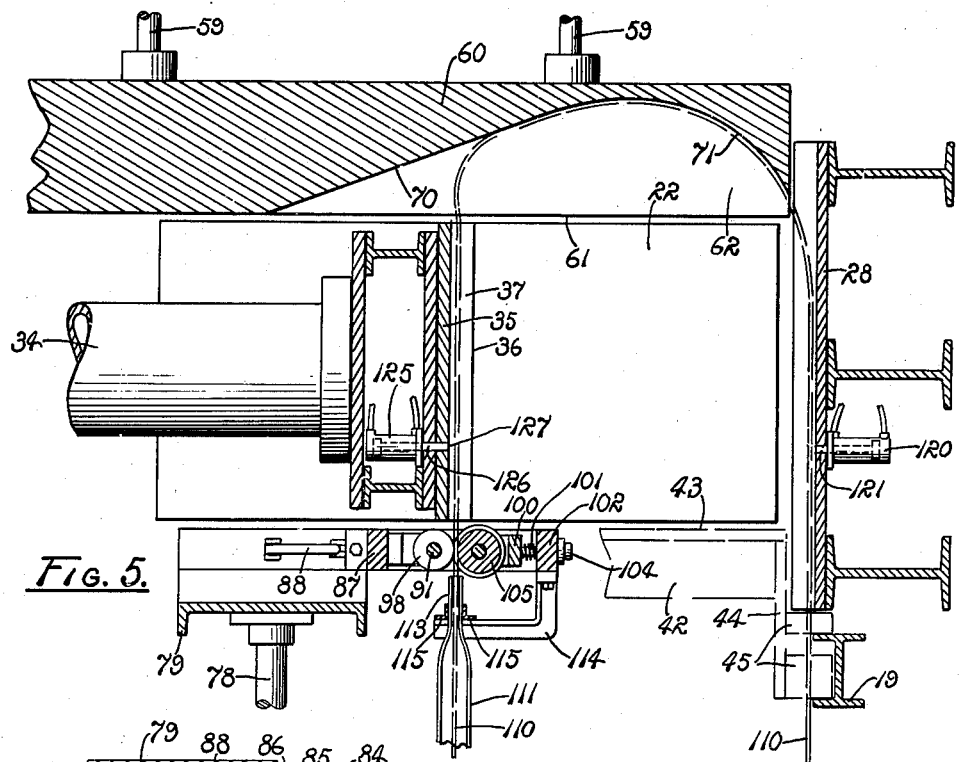
CECIL F. WHITE
INVENTOR
HUEBNER, BEEHLER,
WORREL & HERZIG
ATTORNEYS

United States Patent Office 2,732,792
Patented Jan. 31, 1956

2,732,792

COMPRESSES

Cecil F. White, Fresno, Calif.

Application August 19, 1952, Serial No. 305,106

23 Claims. (Cl. 100—25)

The present invention relates to compresses for forming bales of bulk material, such as cotton, and more particularly to a compress having provision for the application of bale-confining bands while the bales are subjected to maximum, or near maximum, compressive pressures.

In the marketing of cotton, it is the usual practice for ginned lint to be packaged at the gin in approximately 500 pound bales. To form these gin bales, the cotton is usually subjected to approximately 40 to 60 tons of pressure in a press box. The completed gin bales are of a density of about 11 pounds per cubic foot and the cotton is stored in this condition awaiting its sale or other disposition.

It is the usual practice subsequent to the sale of the gin bales for them to be transported to a compress where they are subjected to much greater pressures to form standard density bales of about 22 pounds per cubic foot density or high density bales of approximately 32 pounds per cubic foot density.

Although almost all gin bales are eventually compressed into the standard or high density bales, gins have not heretofore found it economically feasible to provide adquate compress facilities for such extensive compression. Compresses are usually centrally located in cotton producing areas and the gin bales hauled from the gins to the compresses for additional compression in preparation for transmission to domestic or foreign markets. It has long been recognized that it is expensive, inconvenient, and time consuming to load the gin bales at the gin onto railway cars or the like for transmission to the compress, to move the cars to the compress, to unload the cars and process the gin bales into standard or high density bales, and to reload the newly formed bales onto additional railway cars or the like of necessity marshalled for the purpose. It has long been recognized that a solution to this problem which would avoid the labor, expense and inconvenience noted, would be to provide a portable compress which could be made available at successive gins for the compression of gin bales into standard or high density bales. For example, Patent No. 430,985 issued June 24, 1890, to Blackman and No. 534,700 issued February 26, 1895, to Simms et al. related to portable compresses and bear testimony to the early recognition of the problems alluded to.

In spite of the early recognition of the advantages of portable compresses, it has until recently proved impractical to form standard and high density bales by other than immobile, cumbersome, powerful equipment whose requirements appeared incompatible to portability.

For example, conventional compresses not only are bulky structures but require an excessive number of attendants whose presence can not normally be accommodated on a vehicle whose size must of necessity be limited. It is the usual practice to utilize a crew of 10 in simply banding a bale after its compression. Further, it has been necessary to subject bales to excessive pressure so that bands may be put on loosely in order to attain the required speed of banding. This loose banding allows the bale subsequently to expand to the ultimate density of approximately 22 or 32 pounds per cubic foot. The excessive compression and subsequent release for banding purposes, has vastly aggravated the power and strength requirements.

An object is to provide a portable high density compress.

Another object is to provide a compress portable on automotive trucks, railway cars, and the like adapted to form standard and/or high density bales from gin bales of cotton or the like.

Another object is to make possible the banding of bales while subjected to compressive pressures considerably lower than maximum pressures now used by orthodox steam compressors.

Another object is to minimize the labor required in compresses of the character described so as to obviate excessive space requirements for personnel.

Another object is to eliminate the expense, wasted effort, and delay in the conventional cotton marketing procedures involving the transportation of gin bales from gins to compresses and their re-compression at the compresses preliminary to shipment.

Another object is to relieve the demand during national emergencies and otherwise for railway cars, trucks, and other freight handling equipment suited to the transporting of gin bales from gins to compresses, and the labor requirements incident to such transporting, so as to make such equipment and labor available for other, and frequently more urgent, national requirements.

Other objects and advantages are to provide improved elements and arrangements thereof in a device of the character and for the purposes set forth.

Further objects and advantages will become apparent in the subsequent description in the specification.

In the drawings:

Fig. 1 is a plan view of a compress suited to the limitations of portability and adapted to form standard and high density bales from gin bales of cotton or the like.

Fig. 2 is a fragmentary side elevation of the compress shown in Fig. 1.

Fig. 3 is a side elevation of the compress.

Fig. 4 is a vertical transverse section taken on line 4—4 of Fig. 1.

Fig. 5 is a fragmentary horizontal section of the compress showing elements thereof in the positions assumed when a bale has been compressed for the automatic feeding of bands about the bale.

Fig. 6 is an enlarged perspective of a band feeding trough utilized in supplying bands to a powered feeding apparatus.

Fig. 7 is a fragmentary vertical section taken on line 7—7 of Fig. 4 having a central portion thereof broken away for illustrative convenience.

Fig. 8 is a schematic diagram of a suitable hydraulic system for actuating the compress of the present invention.

Fig. 9 is a fragmentary enlarged elevation of an individual band driving mechanism showing a portion of a mounting member therefor in vertical section.

Figure 1:
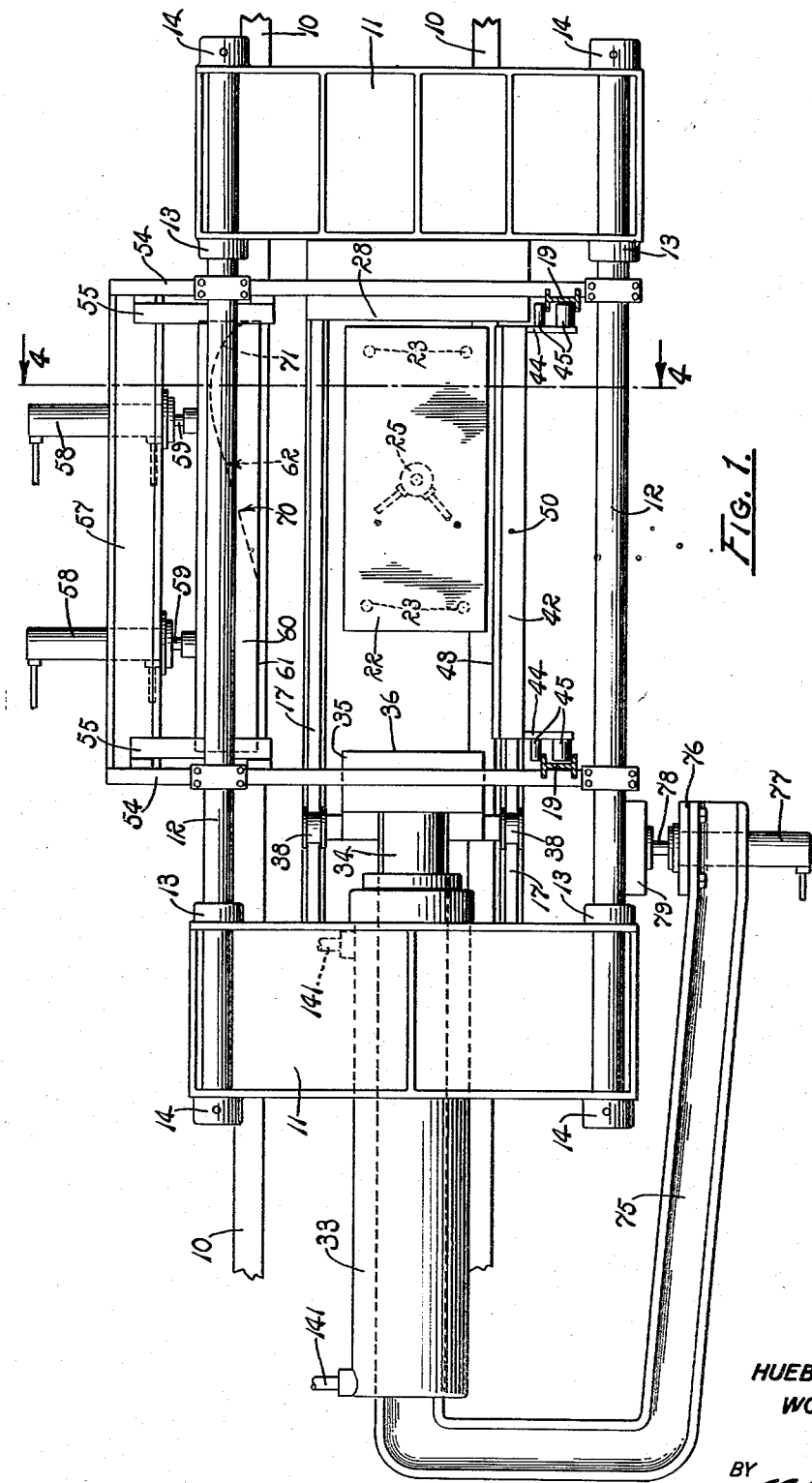

Referring in greater detail to the drawings:

The bed frame of an automotive truck or the like is indicated generally at 10 and serves to support the compress of the present invention for portability. Substantially rectangular heads 11 are rigidly mounted on the bed frame 10 and upwardly extended therefrom in parallel relation. Two pairs of substantially parallel tie rods 12 interconnect the heads 11 and have inner nuts 13 and outer nuts 14 screwthreadably mounted thereon and tightened against their respective heads.

A pair of rails 17 are mounted longitudinally of the bed frame 10 in parallel relation. It will be obvious that the heads 11 mounted transversely of the bed frame 10 are located relative forwardly and rearwardly of each other. For descriptive convenience, the frame head viewed at the left in Fig. 3 is referred to as the forward frame head and the one at the right as the rearward frame head. The rails 17 conveniently connect the forward and rearward frame heads. A pair of substantially parallel transverse rails 18 are rigidly mounted below the rails 17 and extended transversely of the bed frame 10 and laterally from the heads 11 to one side of the frame. A pair of substantially parallel vertical rails 19 are upwardly extended from the transverse rails 18. While the horizontal rails 17 and 18 are conveniently of I beam form providing upwardly disposed support surfaces, the vertical rails 19 are of more truly H beam construction and provide a pair of inwardly and outwardly extended flange portions.

A substantially rectangular bale platform 22 is mounted between the rails 17 and the transverse rails 18 adjacent to the vertical rails 19. The platform is preferably mounted for elevational adjustment on elevator rods 23 slidably fitted into guides 24 supported on the bed frame 10 and an hydraulic ram 25 is connected to the platform and serves controllably elevationally to position the same.

A substantially rectangular platen 28 is rigidly mounted on the rearward frame head 11 in a substantially erect position rearwardly adjacent to the end of the platform 22. It will be noted that the platen provides a compression face 29 disposed toward the platform having a plurality of substantially horizontal grooves 30 therein.

A plurality of two-way hydraulic rams 33 are mounted in a substantially horizontal position in the forward frame head 11. The rams may be of any suitable type. Piston rods 34 extend from the rams toward the platform 22 and mount an end compression platen 35 thereon in a substantially erect position. The end compression platen has a compression face 36 provided with transverse grooves 37 corresponding to the grooves 30. To support the compression platen 35 and to avoid imposition of the weight thereof on the piston rods 34, a pair of flanged wheels 38 are mounted on the platen in rolling engagement with the rails 17, as by legs 39.

A vertically reciprocal platen 42 is mounted on the vertical rails 19. The platen 42 provides a flat compression face 43 and has two pairs of horizontally extended arms 44. A pair of rollers 45 are rotatably mounted on each of the arms in rolling engagement with a flange portion of one of the rails 19. The rollers of each pair engage their respective flange portions on opposite sides so that as the platen is moved elevationally, it is constrained to a vertical position. As shown in Fig. 2, the upper ends of the vertical rails 19 are interconnected by a tie 46. A sheave 47 is rotatably mounted on the tie in elevationally spaced relation to the platen 42 midway between the rails 19 and a sheave 48 rotatably mounted on the tie externally of the rails. A ram 49 is conveniently mounted on the tie in a downwardly extended position. A cable 50 is fastened to the platen 42, extended upwardly and over the sheaves 47 and 48 and then downwardly and secured to a piston rod 51 of the ram. The ram is preferably of well known telescopic form consisting of a plurality of nested piston-cylinder elements so that upon extension sufficient movement is attained to elevate the platen 42 above the end platens 28 and 35.

As evident in Figs. 1 and 4, a pair of transverse members 54 are rigidly mounted on the upper pair of tie rods 12 in vertical alignment with the rails 18. Auxiliary transverse rails 55 are mounted below the transverse members 54 and above the rails 18 in parallel spaced relation thereto. A pair of angle iron posts 56 vertically interconnect the transverse members 54 and rails 18. A rigid strut 57 interconnects the posts 56 substantially midway between members 54 and the rails 18. A pair, or other suitable number, of rams 58 are mounted on the strut 57 in substantially horizontal position and provide piston rods 59 horizontally extended toward the platform 22. A side compression platen 60 is mounted in a substantially erect position on the piston rods and provides a compression face 61. Horizontal grooves 62 are provided in the face 61 in horizontal alignment with corresponding grooves 37 and 30, said grooves defining a band guiding channel about three sides of the platform 22. A significant feature of the grooves in the side compression platen 60 is their provision of longitudinally concave bottoms to return bend bands thrust through the grooves 37 for return through the grooves 30 in a manner which will subsequently be more fully described. A pair of lower flanged wheels 63 are mounted in supporting relation to the side compression platen 60, by legs 64, in rolling engagement on the auxiliary rails 55 mounted on the transverse rails 18 and an upper pair of flanged wheels 65 mounted on the platen, by arms 66, in rolling engagement with the auxiliary rails 55 mounted on the transverse members 54.

It will be apparent that actuation of the rams 33 horizontally reciprocates the end compression platen 35 toward and from its respective opposing rigid platen 28 and actuation of the rams 58 reciprocally positions the compression platen 60 toward and from the elevational platen 42. As shown in Fig. 1, the side compression platen 60 is considerably longer than the platform 22 and slightly overlaps the rigid platen 28 and the end compression, or principal ramming platen 35. The side compression platen is reciprocally positionable between a retracted position, shown in Fig. 1, and a bale forming position shown in Fig. 5. Similarly, the end compression platen 35 is reciprocally positionable between the retracted position shown in Fig. 1 and the bale forming position shown in Fig. 5. The principal ramming platen 35 has a substantially smaller area than the side compression platen 60 and is slidably received between the elevational platen 42 in lowered position and the side compression platen 60 in bale forming position. Cooperatively the platens 28, 35, 42 and 60 define a bale chamber to which access may be gained by raising the platen 42 upon actuation of the ram 49.

Attention is again invited to the significant concavity of the bottom of the grooves 62 in the compression platen 60. As evident in Fig. 5, the bottoms have angular deflecting portions 70 which diverge inwardly from the compression face 61 for a considerable distance on each side of the approximate position assumed by the end compression platen 35 when in bale forming position. The extent of the angular portions 70 accommodate the formation of bales of various sizes. Continuous with the angular portions 70 of the bottoms of the grooves 62 are arcuate portions preferably substantially tangentially related to the bottoms of the grooves 30.

As best shown in Fig. 1, a plurality of gooseneck brackets 75 are rigidly mounted on the end compression platen 35, and extended away from the platform 22 between the rams 33 where they are laterally extended and thence forwardly extended externally of the tie rods 12 and the vertically reciprocal platen 42. A vertical strut 76 interconnects the forwardly extended ends of the gooseneck brackets 75 and serves to mount a pair, or any other suitable number, of feeding head positioning rams 77 in horizontal position transversely of the bed frame 10 and providing inwardly extended piston rods 78. A U-shaped bracket 79 is mounted on the piston rods and constitutes a support frame for the feeding head indicated generally at 80.

As disclosed in Figs. 5 and 7, a pair of substantially parallel arms 84 are mounted in substantially horizontal position on the brackets 79 and extend rearwardly of the bed frame 10. The arms provide juxtapositioned guideways 85 in which slide blocks 86 are mounted. The blocks are interconnected by a rigid feed bar 87 for corresponding movement longitudinally of their respective guideways. Upper and lower toggle links 88 are mounted on the arms 84 and coupled to their respective slide blocks so that manipulation of either toggle link correspondingly to shift the slide blocks 86 longitudinally of their respective guideways and to move the post longitudinally of the frame 10 while constrained to an erect attitude.

Adjacent to the feed bar 87, a feeding shaft 91 is rotatably mounted in the slide blocks 86 in an erect position. A reversible electric motor 92, or other prime mover, is mounted on the upper arm 84 and provides a drive shaft 93. A transmission shaft 94 is rotatably mounted in the feed bar 87 in substantially right angular relation to the feeding shaft 91 and in alignment with the drive shaft 93. Thrust bearings 95 are mounted on the transmission shaft 94 on opposite sides of the post and constrain said shaft to predetermined axial position in the post while accommodating free rotational movement thereof. A sleeve 96 is rigidly mounted on the drive shaft 93 and has slidable splined connection to the transmission shaft 94 so that the feed bar 87 may be reciprocally positioned by means of the toggle links 88 without influencing the described driven connection between the motor 92 and the transmission shaft. A pair of beveled gears 97 mounted on the transmission shaft 94 and on the feeding shaft 91 complete driven connection between the feeding shaft and the motor. Any suitable number of band feeding rollers 98 are mounted on the feeding shaft 91 in vertically spaced relation.

A bifurcated yoke 100 is mounted in horizontal alignment with each of the rollers 98 by a pair of bolts 101 slidably extended from each yoke through a rigid post 102 interconnecting the extended ends of the arms 84. Compression springs 103 are provided between each of the yokes about each of the bolts 101 and nuts 104 screwthreadably mounted on the bolts rearwardly against the rigid post 102 serve adjustibly to position the yokes on the post in spaced relation to the post. A circumferentially grooved idler roller 105 is rotatably mounted in each yoke for cooperative action with its respective feeding roller 98. As shown in Fig. 9, each of the idler rollers 105 has a cylindrical central portion and a radially extended flange on opposite sides thereof. The feeding rollers 98 fit between the flanges on the idler rollers and have circumscribing grooves adapted to receive the rivets of salvaged bands utilized in banding bales of cotton or the like compressed in the bale chamber.

It will be recalled that the gooseneck brackets 75 are mounted on the end compression platen 35 and move integrally therewith. The rams 77 serve only to move the feeding head 80 inwardly and outwardly. Thus at all times, the feeding head bears precisely the same relation to the compression platen 35 longitudinally of the bed frame 10. The nuts 104 are so adjusted that the idler rollers 105 are approximately tangentially related to imaginary lines laterally extended from the grooves 37. It is not necessary that an idler roller be provided for each of the grooves but only for a number thereof equivalent to the number of bands it is desired to tie about a bale formed in the chamber.

As previously described, the principal function of the instant compress is to compress gin bales or bulk material into standard or high density bales. In the process, bands 110 previously utilized to tie the gin bales, are salvaged and re-used to tie the more highly compressed bales. To facilitate the delivery of salvaged or other bands to the feeding head a feeding trough 111 is mounted in a horizontal position in the feeding head in alignment with each of the grooves 37. The troughs may be of any suitable length and preferably are of wide V-shape throughout most of their length and provide delivery ends constricted to compressed U-shape closely adjacent to each of the idler rollers 105. The troughs may be mounted by any suitable structure such as horizontal L brackets 114 weldably or otherwise secured to the rigid post 102 having a pair of vertical stays 115 mounted thereon and between which the constricted ends of the troughs are extended and secured.

A small hydraulic ram 120, or other suitable controlled brake actuating means, is mounted on the rigid platen 28 adjacent to each of the grooves 30 through which it is intended to extend a band 110 and provides a piston rod 121 which may be extended into the groove to hold a band in place or retracted from the groove for free passage of a band.

Similarly, small hydraulic rams 125, or the like, are mounted in the end compression platen 35 adjacent to each of the grooves 37 through which it is intended to project a band and has a piston rod 126 which may be extended into the groove to hold a band in place or retracted from the groove for free passage of the band, as desired. For reasons soon to become apparent, the ends of the piston rods 121 and 126 are preferably provided with friction tips 127 of rubber, knurled metal, or other material suitable to dependable band engagement.

A suitable hydraulic operating system for the described compress is schematically represented in Fig. 8 in which a reservoir of hydraulic fluid is indicated at 130. A driven pump 131 has a suction line 132 connected to the reservoir and provides a high pressure discharge conduit 133. Seven manually controlled valves are connected to the high pressure conduit 133 and are conveniently of a common well known type. Each of the valves is connected to a pair of control lines, subsequently described, and to a return conduit 134 connected to the reservoir. Each of the valves has three positions. In one position it delivers hydraulic fluid under pressure from the conduit 133 to one of its control lines while bleeding the opposite control line and passing the fluid therefrom back to the return conduit 134. In a second position, it seals off both of its control lines while bypassing hydraulic fluid from the conduit 133 back to the conduit 134. In a third position, the valve supplies hydraulic fluid under pressure from the conduit 133 to the opposite control line while bleeding the first named control line back to the conduit 134.

Referring more specifically to Fig. 8, a valve 140 is connected to the conduits 133 and 134 and to the rams 33 for the main compression platen 35 by control lines 141. The control lines connect the rams 33 hydraulically in parallel so that they are subjected to the same hydraulic pressures.

A similar valve 144 is connected to the conduits 133 and 134 and to the rams 58 of the side compression platen 60 by control lines 145. The lines 145 connect the rams 58 hydraulically in parallel so that they are subjected to the same hydraulic control.

A valve 148 is likewise connected to the conduits 133 and 134 and to control lines 149 connected to the ram 49 utilized in vertically positioning the platen 42.

A valve 152 is connected to the conduits 133 and 134 and to control lines 153 which interconnect the rams 77 in parallelism.

Independent valves 154 and 155 are connected in parallel to the conduits 133 and 134. The valve 154 is connected to control lines 156 which interconnect the holding rams 120 in parallelism and the valve 155 to control lines 157 which interconnect the holding ram 125 in parallelism.

A platform control valve 160 is connected to the conduits 133 and 134 and to the ram 25 for elevational positioning of the platform.

While the structure and hydraulic operating system of the present invention have been described in some detail it is obvious that modifications therein can be made without departing from the spirit or the scope of the invention while successfully accomplishing the desired objectives.

*Operation*

The operation of the compress of the present invention is believed to be clearly apparent and is briefly summarized at this point. Bearing in mind that the compress is suited to mounting on the bed frame 10 or other portion of an automotive truck, railway car or the like, it may be conveniently made accessible at any gin where it is desired to compress gin bales into standard or high density bales.

To initiate a compressing operation, it is the usual practice, first to actuate the ram 49 by proper manipulation of the valve 148 to raise the platen 42, as fragmentarily shown in Fig. 3. The end compression platen 35 and the side compression platen 60 are retracted by manipulation of the valves 140 and 144. A gin bale or other mass to be compressed is positioned on the platform 22 and the ram 25 extended or contracted by manipulation of the valve 160 properly to elevate the bale or mass for compression convenience. When a gin bale is placed on the platform, its bands 110 are removed so as to avoid interference with the compression thereof.

The vertically movable platen 42 is lowered into position adjacent to the platform 22 by manual control of the valve 148. The valve 144 is positioned to expand the rams 58 and to thrust the side compression platen 60 into approximately the position shown in Fig. 5, compressing the gin bale or other mass against the vertically movable platen 42.

To achieve the high density desired, the valve 140 is then positioned to actuate the rams 33 which force the principal ramming platen 35 against the bale. The pressure to which the bale is subjected may be manually controlled or automatically regulated in any suitable manner, not shown. During the subjection of the bale to the compression between the platens 35 and 28 while held between the platens 42 and 60, the end platen 35 moves up to approximately the position shown in Fig. 5. The feeding head 80 moves unitarily with the platen 35 so as to maintain alignment with the grooves 37.

The bale or other mass being compressed in the chamber defined by the platens, is subject to sufficient pressure to attain desired density and no excess pressure is required. The vertically reciprocal platen 42 is elevated by the ram 49 in response to manipulation of the valve 148 to the position shown in Fig. 3. This exposes a side of the bale compressed in the chamber while the bale is still held under the maximum compression attained between the end platens 35 and 28. The rams 77 are actuated by the valve 152 and the feeding head 80 moved into the operable position, shown in Fig. 5, beneath the platen 42.

Salvaged bands previously removed from the bale, or new bands, are laid in the troughs 11 with ends thereof extended between the flanges of the idler rollers 105. One or both of the toggles 88 are manipulated to move the feeding rollers 98 into engagement with the bales. The reversible motor 92 is energized so as to rotate the feeding rollers 98 in a counterclockwise direction, as viewed in Fig. 5. The bands 110 engaged between the rollers 98 and 105 are thrust through the grooves 37 and impinge against the angular portion 70 of the bottoms of the grooves 62 and are deflected longitudinally of the grooves. The arcuate portions 71 of the grooves 62 return bend the bands under the urging of the rollers so as to direct them back through the grooves 30. With bands loaded into each of the troughs, the total number of bands required adequately to tie the bale are simultaneously fed thereabout.

As soon as the leading ends of the bands emerge from the grooves 30, the rams 120 are actuated by the valve 154 and the motor 92 reversed. The piston rods 121 engage the bands and hold the ends thereof fed through the grooves in position while the reversing of the motor tightens the bands about the bale into the position generally shown in dashed line in Fig. 5. When the bands have been adequately tightened, the rams 125 are actuated by the valve 155 and the motor 92 stopped. The toggles are released to retract the feeding rollers 98 from the bands and the rams 77 contracted to retract the feeding head from beneath the platen 42. So conditioned, opposite ends of the bands 110 dependably held by the rams 120 and 125 tensioned about three sides of the bale are accessible for manual securing in the usual way. The rams 33 and 58 are contracted to relieve the high density bale from compression so that the bale may conveniently be removed and a new gin bale or other compressible material positioned on the platform for repeated operation.

By permitting the banding of the bales formed in the compress of the present invention while subjected to the maximum pressure required, requirements for excess pressure normally utilized in overcompressing is obviated. The substantial reduction in the maximum pressures required makes possible the construction of lighter, less expensive, less bulky, and more economical compresses capable of forming standard and high density bales and suited to portability.

The powered feeding of the bands 110 through the guide channels defined by the aligned grooves 37, 62 and 30 reduces the number of attendants required to band bales from nine to one and permits a substantial saving in space, labor and time.

In making possible the first practical portable cotton compresses known in the trade, vast savings have been made possible in eliminating the successive handling and transporting required in moving gin bales from gins to compresses so as to condition the bales for shipment to market for export.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. The combination in a compress of opposing horizontally grooved substantially erect parallel platens constituting opposite sides of a bale chamber defined therebetween, a substantially erect platen mounted for reciprocal elevational movement laterally adjacent to said opposing platens, guide means constraining the elevational platen to reciprocal movement in a predetermined substantially vertical path between a compression resistant position in bale chamber defining relation with said opposing platens and a retracted position, and a horizontally grooved platen adapted to apply compressive force against a bale in the chamber mounted in substantially parallel relation to the elevationally movable platen for horizontal movement toward and from the elevationally movable platen while maintaining substantially parallel relation thereto at the side of the opposing platens opposite to said elevationally movable platen constituting a fourth side of said bale chamber, the grooves in the platens being aligned cooperatively to provide a continuous band guiding channel along three sides of the bale chamber, said channel having open opposite ends accessible by vertical movement of the elevationally movable platen.

2. In a compress, the combination of a plurality of platens having a predetermined bale chamber defining relation including a movable platen reciprocally positionable to and from said bale chamber defining relation with its associated platens, powered means for urging the movable platen into said bale chamber defining relation to compress material into bale form between the platens, one of said platens being retractable to provide access to a side of a bale held under compression by the other platens, said other platens cooperatively providing a band guide channel from an edge of the accessible side of the bale about the bale to the opposite edge of said accessible side, powered band feeding means mounted for reciprocal movement between adjacent alignment with the channel at an edge of the accessible side of the bale when the retractable platen is withdrawn and a retracted position for return of the retractable platen to bale chamber defining position, and holding means mounted in the platens at opposite edges of the accessible side of the bale adapted to hold the band against the bale while the feeding means is withdrawn and the band secured.

3. The combination in a compress of a substantially rectangular bale supporting platform; a horizontally grooved compression resisting platen rigidly mounted adjacent to the platform in a substantially vertical position; a substantially vertical, horizontally grooved, end ramming platen mounted for reciprocal horizontal movement toward and from the rigid platen and opposite to the platform from said rigid platen; a substantially vertical compression resisting platen mounted for reciprocal elevational movement laterally adjacent to the ramming platen, platform, and rigid platen; guide means constraining the elevational platen to reciprocal movement in a predetermined substantially vertical path between a compression resistant position in bale chamber defining relation with the ramming platen and the rigid platen and a retracted position; and a substantially vertical side ramming platen mounted in spaced parallel relation to the elevationally movable platen on the opposite side of the platform therefrom for reciprocal horizontal movement in a substantially rectilinear path toward and from the elevationally movable platen while maintaining said parallel relationship, said side ramming platen having substantially horizontal grooves aligned with the grooves of the rigid platen and of the end ramming platen and therewith defining continuous band guiding channels about three sides of the platform having opposite open ends accessible by moving the elevational platen elevationally from the platform, the grooves in the side ramming platen having concave bottoms adapted to return bend bands thrust through the band guiding channels.

4. In a compress, a plurality of platens arranged to define a bale compressing chamber, means mounting one of said platens for controlled movement into position in said chamber defining arrangement and from said position to a retracted position for access to the chamber, the other platens having inwardly disposed aligned grooves therein defining band guide channels about the chamber having open ends disposed toward said retractable platen, power driven band feeding means, and means mounting the band feeding means for reciprocal movement between a position occupied by the movable platen when in bale chamber defining position in alignment with the open ends of the guide channels and a retracted position accommodating return of said movable platen to the chamber defining arrangement.

5. In a compress, a plurality of platens arranged to define a bale compressing chamber, means mounting one of said platens for controlled movement into position in said chamber defining arrangement and from said position to a retracted position for access to the chamber, the other platens having inwardly disposed aligned grooves therein defining band guide channels about the chamber having open ends disposed toward said retractable platen, reversible power driven band feeding means, means mounting the band feeding means for reciprocal movement between a position in alignment with the open ends of the guide channels when the retractable platen is retracted to feed bands about the chamber and a retracted position for return of said platen to the chamber defining arrangement, releasable band holding means mounted on a platen adjacent to the ends of the channels opposite to the band feeding means operatively associable with bands fed through the channels to hold the bands whereby the bands are tightened about a bale in the chamber by reversing the feeding means, and secondary releasable band holding means mounted on a platen adjacent to the feeding means operatively associable with bands tightened about a bale in the chamber to hold the bands for retraction of the feeding means and fastening of the bands.

6. In a compress, the combination of two pairs of opposing platens arranged to define a bale compression chamber, one platen of each pair being movable relatively toward and away from its respective opposing platen successively to compress material into bales within the chamber and to release the bales thus formed, three consecutively adjacent platens in the chamber defining arrangement thereof having aligned inwardly disposed band guiding channels about three sides of the chamber and the fourth platen being retractable from chamber defining arrangement with the other platens for access to bales compressed in the chamber and for access to opposite ends of the channels, reversible band feeding means, means mounting the feeding means for movement between a position in adjacent alignment with corresponding ends of the channels when said fourth platen is retracted and a retracted position for return of the retractable platen to said chamber defining arrangement, holding means mounted in the guide channels of the platens adjacent to said fourth platen engageable with bands fed through the channels to hold the same against slippage about a bale in the chamber, and means for independently actuating the holding means on the opposite platens.

7. The combination in a compress of a bale support; a horizontally grooved end platen rigidly mounted adjacent to the bale support in a substantially vertical position; a substantially vertical, horizontally grooved end ramming platen mounted for reciprocal horizontal movement toward and from the rigid platen and opposite to the bale support therefrom; a substantially vertical platen mounted for reciprocal elevational movement laterally adjacent to the ramming platen, platform, and rigid platen; a substantially vertical side ramming platen mounted for reciprocal horizontal movement toward and from the elevationally movable platen and opposite to the bale support therefrom, said side ramming platen having substantially horizontal grooves aligned with the grooves of the rigid end platen and of the end ramming platen and therewith defining continuous band guiding channels about the bale support having opposite open ends accessible by elevation of the elevational side platen; reversible power driven band feeding means; means mounting the band feeding means for reciprocal movement between a position in adjacent alignment with the open ends of the guide channels when the elevational platen is elevated to feed bands into the channels and a retracted position for return of said elevational platen; releasable band holding means mounted on the rigid end platen adjacent to the ends of the channels opposite to the band feeding means operatively associable with bands fed through the channel to hold the bands whereby the bands are tightened about a bale in the chamber by reversing the feeding means; and secondary releasable band holding means mounted on the end ramming platen adjacent to the feeding means operatively associable with bands tightened about a bale in the chamber to hold the bands for retraction of the feeding means.

8. The combination in a compress of a substantially rectangular bale supporting platform; a horizontally grooved end platen rigidly mounted adjacent to an end of the platform in a substantially vertical position; a substantially vertical, horizontally grooved end ramming platen mounted for reciprocal horizontal movement toward and from the rigid platen and opposite to the platform therefrom; a substantially vertical platen mounted for reciprocal elevational movement laterally adjacent to the ramming platen, platform, and rigid platen; a substantially vertical side ramming platen mounted for reciprocal horizontal movement toward and from the elevationally movable platen and opposite to the platform therefrom, said side ramming platen having substantially horizontal grooves aligned with the grooves of the rigid end platen and of the end ramming platen and therewith defining continuous band guiding channels about three sides of the platform having opposite open ends accessible by elevation of the elevational side platen; the grooves in the side ramming platen having longitudinally concave bottoms providing surfaces obliquely disposed to the grooves in the end platens whereby bands thrust through the band guiding channels are deflected about a bale compression chamber defined by the platens; powered means connected to the ramming platens adapted reciprocally to position their respective platens to compress bales within the chamber and to release such bales; powered means connected to the elevational platen for controlled elevational positioning thereof; a bracket mounted on the end compression platen and movable integrally therewith extended along a side of the platform outwardly of the elevational platen; a pair of cooperative feed rollers rotatably mounted on the bracket in alignment with each of the guide channels in the end compression platen; reversible drive means connected to a feed roller of each pair of rollers; holding plungers mounted in the guide channels of the end platens adjacent to the elevational platen engageable with bands fed through the channels to hold the bands inwardly against bales compressed between the platens; and means for independently actuating the holding plungers on the opposite platens.

9. A compress comprising a substantially rectangular horizontal platform, a fixed end platen mounted in an erect position at an end of the platform, an end compression platen mounted in an erect position at the end of the platform opposite to the fixed platen for reciprocal movement toward and from the fixed platen, a side platen mounted in an erect position at a side of the platform for reciprocal elevational movement to and from the platform, a side compression platen mounted in an erect position at the side of the platform opposite to the elevationally reciprocal platen for reciprocal movement toward and from the elevationally reciprocal platen, powered means connected to the compression platens adapted to force the compression platens toward their respective opposite platens to compress material into bale form between the platens and to retract the platens from bales thus formed, control means for raising and lowering the elevationally reciprocal platen, the end platens having corresponding substantially horizontal band guide channels thereacross and the side compression platen having substantially horizontal band guide channels thereacross aligned with the guide channels of the end platens having cam-like concave bottoms adapted to return bend bands thrust through the channels of one end platen back through corresponding channels of the opposite end platen, a bracket mounted on the end compression platen and movable integrally therewith extended along a side of the platform outwardly of the elevational platen, a pair of cooperative feed rollers rotatably mounted on the bracket in alignment with each of the guide channels in the end compression platen, reversible drive means connected to the feed rollers, trough means carried by the bracket aligned with each pair of feed rollers for guiding bands therebetween, holding plungers mounted in the guide channels of the end platens adjacent to the elevational platen engageable with bands fed through the channels to hold the bands inwardly against bales compressed between the platens, and means for independently actuating the holding plungers on the opposite platens.

10. A compress comprising a substantially horizontal platform having opposite side edges and end edges, a fixed end platen mounted in an erect position at an end of the platform, an end compression platen mounted in an erect position at the end of the platform opposite to the fixed platen for reciprocal movement toward and from the fixed platen, the end platens having corresponding substantially horizontal band guide channels thereacross, a side platen mounted in erect position at a side of the platform for reciprocal elevational movement to and from the platform, a side compression platen mounted in an erect position at the side of the platform opposite to the elevational platen for reciprocal movement toward and from the elevational platen, powered means connected to the compression platens adapted to force the platens toward their opposite platens to compress material in bale form between the platens and to retract the platen after such a bale has been banded, control means for raising and lowering the elevational platen, a gooseneck bracket mounted on the end compression platen and movable integrally therewith extended along the side of the platform outwardly of the elevational platen, a feeding head mounted in erect position on the bracket for reciprocal movement toward and from the end compression platen, an idler feed roller rotatably mounted in the head adjacent to each of the guide channels in the end compression platen each having a periphery in substanial tangential alignment with its respective channel, an erect feed bar mounted in the head for reciprocal positioning toward and from the idler rollers, drive feed rollers rotatably mounted on the bar in individual alignment with the idler rollers, control means for moving the feed bar toward and from the idler rollers whereby the drive rollers are brought into cooperative relation with, and retracted from, the idler rollers, reversible drive means mounted on the bracket, a telescopic drive linkage interconnecting the drive means and the drive rollers, trough means carried by the feeding head aligned with each pair of feed rollers whereby bands placed in the troughs are, upon actuation of the drive means, fed into the guide channels of the end compression platen, the side compression platen having guide channels transversely therein interconnecting corresponding channels of the end platens providing cam-like concave bottoms adapted to receive leading ends of bands from the end compression head and to return the leading ends through the channels of the fixed platen, holding plungers mounted in the channels of the fixed platen adjacent to the elevational platen engageable with the bands fed therethrough to press the bands against bales formed between the platens to hold the leading ends, means for actuating the plungers after the feeding of bands about a bale to hold the leading ends of the bands while the drive means and drive rollers are reversed to tighten the bands about three sides of the bale, holding plungers mounted in the channels of the end compression platen adjacent to the elevational platen engageable with the bands fed therethrough to press the bands against the bale to hold the same, and means for actuating the plungers in the end compression platen after the bands are tightened whereby the bands are held tightly about three sides of the bale while the fourth side is accessible for securing the bands.

11. The combination in a compress of opposing correspondingly grooved substantially parallel platens constituting opposite ends of a bale chamber therebetween, an edgewardly reciprocal platen mounted for reciprocal movement laterally adjacent to the opposing platens and constituting a removable third side of the bale chamber, guide means constraining the reciprocal platen to movement in a predetermined path in a plane normal to said opposing platens between a compression resistant position adjacent to the opposing platens and a position retracted edgewardly therefrom, and a side compression platen mounted for movement in a rectilinear path toward and from the edgewardly reciprocal platen at the side of the opposing platens opposite to the edgewardly reciprocal platen, said compression platen constituting a fourth side of said bale chamber, the side compression platen having grooves communicating between corresponding grooves in said opposing platens cooperatively to provide a continuous band guiding channel along three sides of the bale chamber, the grooves in the side compression platen having concave bottoms adapted to return bend bands thrust through the band guiding channels, said channels having open opposite ends accessible by movement of the edgewardly reciprocal platen to retracted position.

12. The combination in a compress of opposing correspondingly grooved substantially parallel platens constituting opposite ends of a bale chamber therebetween, an edgewardly reciprocal platen mounted for reciprocal movement laterally adjacent to the opposing platens and constituting a removable third side of the bale chamber, guide means constraining the reciprocal platen to movement in a predetermined path in a plane normal to said opposing platens between a compression resistant position adjacent to the opposing platens and a position retracted edgewardly therefrom, a side compression platen mounted in substantially parallel relation to the edgewardly reciprocal platen for movement toward and from the edgewardly reciprocal platen in spaced relation thereto, said compression platen constituting a fourth side of said bale chamber, the side compression platen having grooves communicating between corresponding grooves in said opposing platens cooperatively to provide a continuous band guiding channel along three sides of the bale chamber, the grooves in the side compression platen having concave bottoms adapted to return bend bands thrust through the band guiding channels, said channels having open opposite ends accessible by movement of the edgewardly reciprocal platen to retracted position, and band holding means mounted in said opposing platens adjacent to the open opposite ends of the channels adapted to hold bands thrust through the channels at opposite sides of the bale chamber for retraction of the edgewardly reciprocal platen and fastening of the bands.

13. In a compress, the combination of a plurality of platens having a predetermined bale chamber defining relation including a movable platen reciprocally positionable to and from said bale chamber defining relation with its associated platens, power means for urging the movable platen into said bale chamber defining relation to compress material into bale form between the platens, one of said platens being retractable to provide access to a side of a bale held under compression by the other platens, said other platens cooperatively providing a band guide channel from an edge of the accessible side of the bale about the bale to the opposite edge of said accessible side, and powered band feeding means mounted for reciprocal movement between adjacent alignment with the channel at an edge of the accessible side of the bale when the retractable platen is withdrawn and a retracted position for return of the retractable platen to bale chamber defining position.

14. In a compress, a plurality of platens arranged to define a bale compressing chamber, means mounting one of said platens for controlled movement into position in said chamber defining arrangement and from said position to a retracted position for access to the chamber, the other platens having inwardly disposed aligned grooves therein defining band guide channels about the chamber having open ends disposed toward said retractable platen, reversible power driven band feeding means mounted adjacent to the open ends of the channels at one side of the retractable platen adapted to thrust bands through the channels, and releasable band holding means mounted on a platen adjacent to the ends of the channels opposite to the band feeding means operatively associable with bands fed through the channels to hold the bands, the band feeding means being reversible to tension bands about a bale in the chamber while the bands are held by the holding means.

15. In a compress, a plurality of platens arranged to define a bale compressing chamber; means mounting one of said platens for controlled movement into position in said chamber defining arrangement and from said position to a retracted position for access to the chamber, the other platens having inwardly disposed aligned grooves therein defining band guide channels about the chamber having open ends disposed toward said retractable platens, one of said other platens being a compression platen mounted for reciprocal movement to and from chamber defining arrangement to compress material into bales in the chamber; powered means connected to the compression platen adapted reciprocally to position said platen to compress bales within the chamber and to release such bales; a bracket mounted on the compression platen and movable integrally therewith extended outwardly adjacent to the retractable access platen; a pair of cooperative feed rollers rotatably mounted on the bracket in alignment with each of the guide channels in the compression platen; reversible drive means connected to a feed roller of each pair of rollers; holding means mounted in the guide channels of the platens adjacent to the open ends thereof disposed toward the retractable platen; and means for independently actuating the holding means at opposite ends of the channels.

16. In a compress, a plurality of platens in substantially rectangular arrangement defining a bale compressing chamber therebetween; means mounting one of said platens for controlled movement into position in said chamber defining arrangement and from said position to a retracted position for access to the chamber, the other platens having inwardly disposed aligned grooves therein defining band guide channels about the chamber having open ends disposed toward said retractable platen; means mounting one of said other platens adjacent to the retractable platen for reciprocal movement to and from the bale defining arrangement along a path of movement substantially parallel to the retractable platen to compress material into bales in the chamber; powered means connected to the compression platen adapted to force the platen into bale chamber defining arrangement to compress material between the platens and to retract the compression platen after such a bale has been formed; control means for moving the retractable platen to and from bale defining arrangement; a bracket mounted on the compression platen and movable integrally therewith extended outwardly alongside of the retractable platen; a pair of cooperative feed rollers rotatably mounted on the bracket in alignment with each of the guide channels in the compression platen; reversible drive means connected to the feed rollers; and trough means carried by the bracket aligned with each pair of feed rollers for guiding bands therebetween.

17. In a compress, a plurality of platens in substantially rectangular arrangement defining a bale compressing chamber therebetween; means mounting one of said platens for controlled movement into position in said chamber defining arrangement and from said position to a retracted position for access to the chamber, the other platens having inwardly disposed aligned grooves therein defining band guide channels about the chamber having open ends disposed toward said retractable platen; means mounting one of said other platens adjacent to the retractable platen for reciprocal movement to and from the bale defining arrangement along a path of movement substantially parallel to the retractable platen to compress material into bales in the chamber; powered means connected to the compression platen adapted to force the platen into bale chamber defining arrangement to compress material between the platens and to retract the compression platen after such a bale has been formed; control means for moving the retractable platen to and from bale defining arrangement; a bracket mounted on the compression platen and movable integrally therewith extended outwardly alongside of the retractable platen; a pair of cooperative feed rollers rotatably mounted on the bracket in alignment with each of the guide channels in the compression platen; reversible drive means connected to the feed rollers; trough means carried by the bracket aligned with each pair of feed rollers for guiding bands therebetween; band holding means mounted in opposite ends of the guide channels in the opposite platens adjacent to the retractable platen engageable with bands fed through the channels to hold the same in position about bales compressed between the platens; and means for independently actuating the holdings means on the opposite platens.

18. In a compress, a plurality of platens in substantially rectangular arrangement defining a bale compressing chamber therebetween; means mounting one of said platens for controlled movement into position in said chamber defining arrangement and from said position to a retracted position for access to the chamber, the other platens having inwardly disposed aligned grooves therein defining band guide channels about the chamber having open ends disposed toward said retractable platen; means mounting one of said other platens adjacent to the retractable platen for reciprocal movement to and from the bale defining arrangement along a path of movement substantially parallel to the retractable platen to a compress material into bales in the chamber; powered means connected to the compression platen adapted to force the platen into bale chamber defining arrangement to compress material between the platens and to retract the compression platen after such a bale has been formed; control means for moving the retractable platen to and from bale defining arrangement; a bracket mounted on the compression platen and movable integrally therewith extended outwardly adjacent to the retractable platen; a feeding head mounted on the bracket in substantial alignment with the guide channels in the compression platen; an idler feed roller rotatably mounted in the head adjacent to each of the guide channels in the compression platen each having a periphery in substantial tangential alignment with its respective platen; an erect feed member mounted in the head for reciprocal positioning toward and from the idler rollers; driven feed rollers rotatably mounted on the feed member in individual alignment with the idler rollers; and control means for moving the feed member toward and from the idler rollers whereby the drive rollers are brought into cooperative relation with, and retracted from, the idler rollers.

19. In a compress, a plurality of platens in substantially rectangular arrangement defining a bale compressing chamber therebetween; means mounting one of said platens for controlled movement into position in said chamber defining arrangement and from said position to a retracted position for access to the chamber, the other platens having inwardly disposed aligned grooves therein defining band guide channels about the chamber having open ends disposed toward said retractable platen; means mounting one of said other platens adjacent to the retractable platen for reciprocal movement to and from the bale defining arrangement along a path of movement substantially parallel to the retractable platen to a compress material into bales in the chamber; powered means connected to the compression platen adapted to force the platen into bale chamber defining arrangement to compress material between the platens and to retract the compression platen after such a bale has been formed; control means for moving the retractable platen to and from bale defining arrangement; a bracket mounted on the compression platen and movable integrally therewith extended outwardly adjacent to the retractable platen; a feeding head mounted on the bracket in substantial alignment with the guide channels in the compression platen; an idler feed roller rotatably mounted in the head adjacent to each of the guide channels in the compression platen each having a periphery in substantial tangential alignment with its respective platen; and erect feed member mounted in the head for reciprocal positioning toward and from the idler rollers; driven feed rollers rotatably mounted on the feed member in individual alignment with the idler rollers; control means for moving the feed member toward and from the idler rollers whereby the drive rollers are brought into cooperative relation with, and retracted from, the idler rollers; reversible drive means mounted on the bracket; a telescopic drive linkage interconnecting the drive means and the driven rollers; band positioning means carried by the feeding heads aligned with each pair of feed rollers whereby bands placed in the positioning means are, upon actuation of the drive means, fed into the guide channels of the compression platen; holding plungers mounted in the opposite platens adjacent to the retractable platen in opposite ends of the guide channels engageable with bands fed through the channels to press the bands against bales formed between the platens; means for actuating the plungers in the platen opposite to the compression platen after the feeding of bands about a bale to hold the leading ends of the bands while the drive means and drive rollers are reversed to tighten the bands about three sides of the bale; and means for actuating the plungers in the compression platen after the bands are tightened whereby the bands are held tightly about three sides of the bale while the fourth side is accessible by retraction of the retractable platen for securing the bands.

20. In a compress, the combination of a plurality of substantially erect platens having predetermined bale chamber defining relation including a movable platen reciprocally positionable to and from said bale chamber defining relation with its associated platens, powered means for urging the movable platen into said bale chamber defining relation to compress material into bale form between the platens, there being three consecutively adjacent platens in the chamber defining arrangement having aligned inwardly disposed band guiding channels about three sides of the chamber having open ends accessible from a fourth side of the chamber, corresponding channels of each of the adjacent platens being located in common substantially horizontal planes, powered band feeding means mounted in the planes of the channels adapted to feed bands into corresponding open ends of the channels for passage about the bale chamber and out the opposite open ends of the channels, and band holding means mounted adjacent to the open ends of the channels opposite to the band feeding means adapted releasably to hold bands fed through the channels.

21. In a compress, the combination of a plurality of platens having predetermined bale chamber defining relation including a movable platen reciprocally positionable to and from said bale chamber defining relation with its associated platens, powered means for urging the movable platen into said bale chamber defining relation to compress material into bale form between the platens, there being three consecutively adjacent substantially right angularly related platens in the chamber defining arrangement having aligned inwardly disposed band guiding channels about three sides of the chamber having open ends accessible from a fourth side of the chamber, corresponding channels of each of the adjacent platens being located in common planes transversely of the platens, powered band feeding means mounted in the planes of the channels adapted to feed bands into corresponding open ends of the channels for passage about the bale chamber and out the opposite open ends of the channels, and band holding means mounted adjacent to the open ends of the channels opposite to the band feeding means adapted releasably to hold bands fed through the channels.

22. A compress comprising a plurality of compress platens including pairs of right-angularly related platens arranged in a substantially rectangular bale chamber defining relation with the platens in substantially parallel facing relation with respective opposed platens, a pair of right angularly related platens being movable, powered means for reciprocally moving the movable platens to and from said bale chamber defining relation along substantially right-angularly related rectilinear paths, the platens having a plurality of inwardly disposed bale band feeding channels, corresponding channels of adjacent platens being located in common planes transversely of the platens and having open ends accessible from one side of the chamber, powered band feeding means mounted in the planes of the channels adapted to feed bands into corresponding open ends of the channels for passage about the bale chamber and out the opposite open ends of the channels, and band holding means mounted adjacent to the open ends of the channels opposite to the band feeding means adapted releasably to hold bands fed through the channels.

23. A compress comprising a plurality of compress platens including pairs of right-angularly related platens arranged in a substantially rectangular bale chamber defining relation with the platens in substantially parallel facing relation with respective opposed platens, a pair of right-angularly related platens being movable, powered means for reciprocally moving the movable platens to and from said bale chamber defining relation along substantially right-angularly related rectilinear paths, the platens having a plurality of inwardly disposed bale band feeding channels, corresponding channels of adjacent platens being located in common planes transversely of the platens and having opposite open ends accessible from one side of the chamber, and powered band feeding means mounted in the planes of the channels adapted to feed bands into corresponding open ends of the channels for passage about the bale chamber and out the opposite open ends of the channels, the platen opposite to the side of the chamber at which the channels have open ends providing chanels having concave bottoms to return bend bands thrust therethrough.

References Cited in the file of this patent

UNITED STATES PATENTS

| | | |
|---|---|---|
| 150,818 | Brown | May 12, 1874 |
| 1,033,829 | Saddlemire | July 30, 1912 |
| 1,096,397 | Sheppard | May 12, 1914 |
| 1,121,571 | Sheppard | Dec. 15, 1914 |
| 1,284,756 | O'Donnell | Nov. 12, 1918 |